June 18, 1968

T. A. PREWITT 3,389,317

SYSTEM FOR MAINTAINING AN ELECTRIC MOTOR
AT A PREDETERMINED SPEED

Filed March 21, 1966

2 Sheets-Sheet 1

INVENTOR
Thomas A. Prewitt
BY
Richard G. Stahl
HIS ATTORNEY

INVENTOR
Thomas A. Prewitt
BY
Richard G. Stahr
HIS ATTORNEY

United States Patent Office 3,389,317
Patented June 18, 1968

3,389,317
SYSTEM FOR MAINTAINING AN ELECTRIC MOTOR AT A PREDETERMINED SPEED
Thomas A. Prewitt, Kokomo, Ind., assignor to General Motors Corporation, Detroit, Mich., a corporation of Delaware
Filed Mar. 21, 1966, Ser. No. 536,163
7 Claims. (Cl. 318—325)

This invention relates to a system for maintianing an electric motor at a predetermined speed.

Presently available governor systems for use with electric motors employ contacts mounted upon the rotor of the motor which are arranged to open at a predetermined speed to interrupt the energizing circuit of the motor. In addition to being unreliable and difficult to adjust, governors of this type require the motor to be stalled before speed selection adjustments may be made. Usually, the motor must be stopped and started several times before the desired speed is realized.

As the use of constant speed motors, particularly in the fractional horsepower ratings, is becoming increasingly popular, a system for maintaining an electric motor at a predetermined speed which is reliable in operation, economical to manufacture, has a long operating life and which may be adjusted while the motor is running, is highly desirable.

It is, therefore, an object of this invention to provide an improved system for maintaining an electric motor at a predetermined speed.

It is another object of this invention to provide an improved system for maintaining an electric motor at a predetermined speed which may be adjusted while the motor is running.

In accordance with this invention, a system for maintaining an electric motor at a predetermined speed is provided wherein a magnetically operable switching device is located to be in operative relationship with a permanent magnet, mounted upon a member which revolves at a speed which is a function of the speed of the motor in such a manner as to be displaced by a distance proportional to rotational speed, when the motor is rotating at a predetermined speed to operate an electric circuit which controls the supply potential to the motor.

Figure 1:
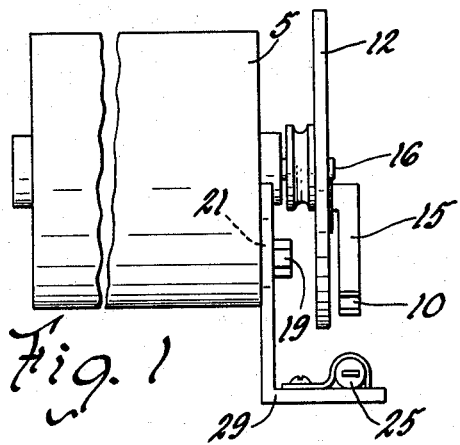
Figure 2:
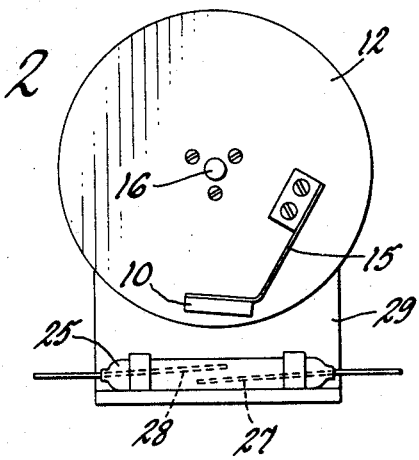
Figure 3:
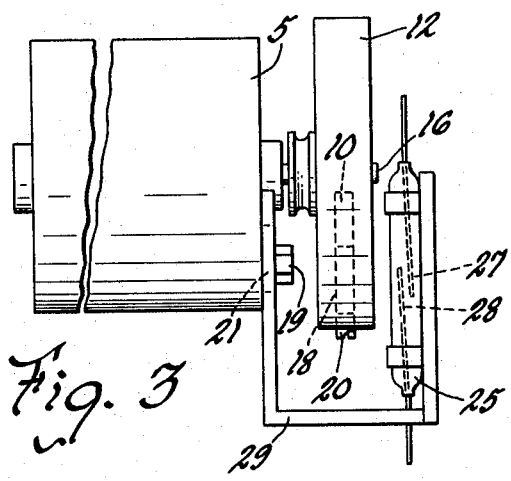
Figure 4:
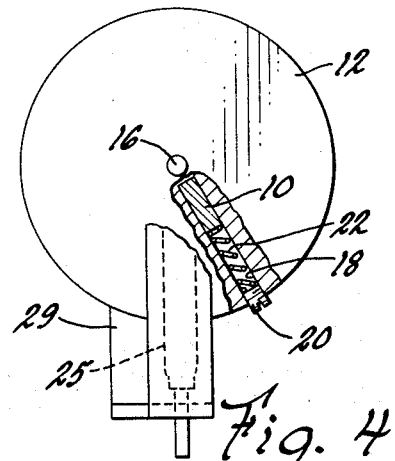
Figure 5:
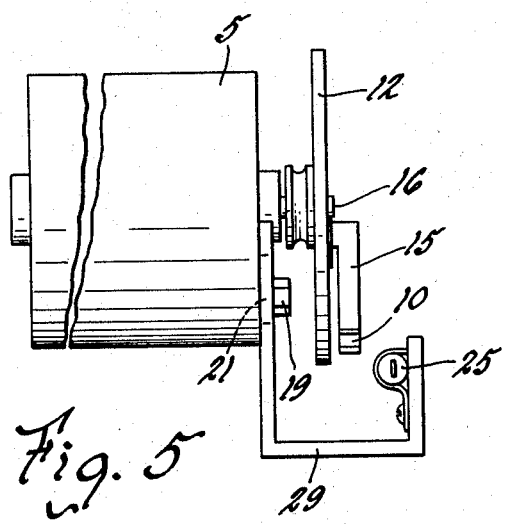
Figure 6:
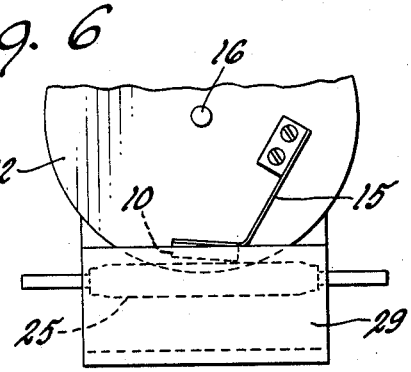
Figure 7:
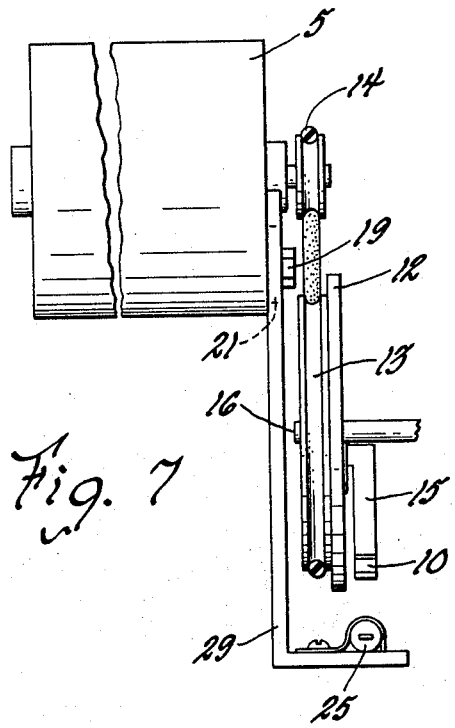
Figure 8:
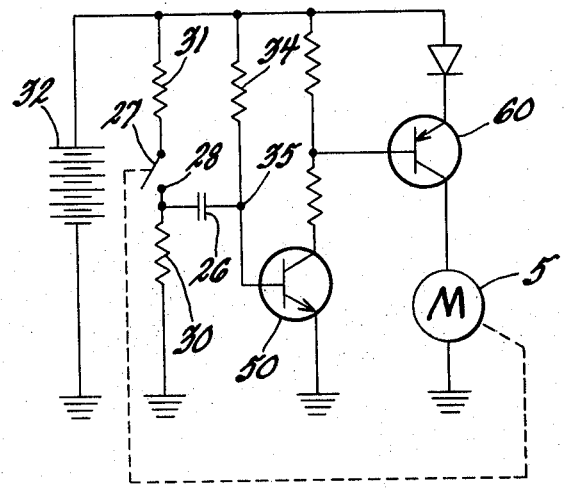
Figure 9:
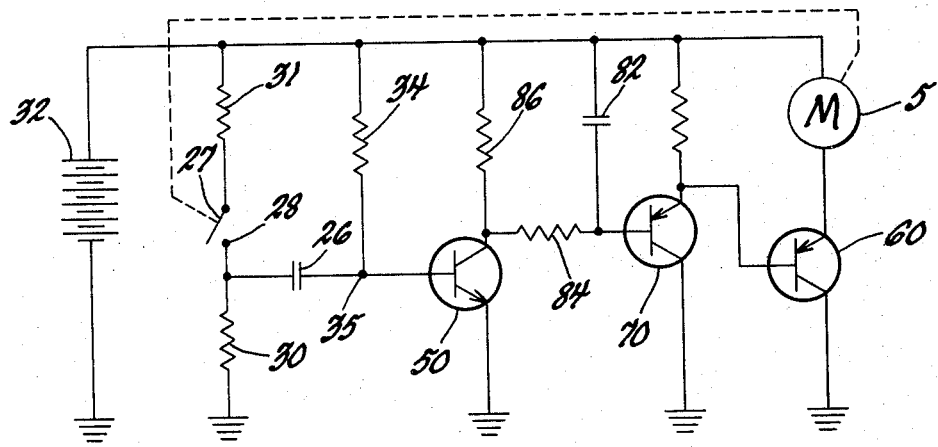

For a better understanding of the present invention, together with additional objects, advantages and features thereof, reference is made to the following description and accompanying drawings wherein like elements throughout the several views have been given like characters of reference:

FIGURE 1 is a front elevation view of the novel system of this invention mounted upon a motor, FIGURE 2 is an end view of FIGURE 1, FIGURE 3 is a front elevation view of an alternate embodiment of the novel system of this invention mounted upon a motor, FIGURE 4 is an end view, partially in cutaway, of FIGURE 3, FIGURE 5 is a front elevation view of an alternate method for mounting the novel system of this invention upon a motor, FIGURE 6 is a fragmentary end view of FIGURE 5, FIGURE 7 is a front elevation view of the novel system of this invention mounted upon a rotatable member externally of the motor which is revolvable at a speed which is a function of the speed of the motor, FIGURE 8 is a schematic diagram of an electric circuit suitable for use in combination with the novel system of this invention, and FIGURE 9 is a schematic diagram of another electrical circuit suitable for use in combination with the novel system of this invention.

Referring to FIGURES 1 and 2 of the drawings, which illustrate the novel system of this invention mounted upon an electrical motor 5, the control system of this invention is comprised of two basic elements, a permanent magnet and a magnetically operable switch member which is located in operative relationship with the permanent magnet at the predetermined speed of the motor.

Permanent magnet 10 is mounted upon a rotatable member 12 which is revolvable at a speed which is a function of the speed of motor 5. Rotatable member 12 may be secured to a rotating element of motor 5, as is shown in FIGURES 1-6, inclusive, or it may be mounted upon a rotatable member mounted externally of the motor but which revolves at a speed which is a function of motor speed, as is shown in FIGURE 7. In FIGURE 7, the rotatable member 12 is mounted externally of motor 5 upon a rotatable member 13 which is driven by motor 5 through belt 14 in a manner well known in the art.

Permanent magnet 10 is mounted upon rotating member 12 by a mounting arrangement which permits displacement of permanent magnet 10 by a distance proportional to rotational speed. In FIGURES 1, 2, 5, 6 and 7, permanent magnet 10 is shown to be mounted upon a spring member 15 in such a manner that permanent magnet 10 will move in a direction generally away from the center of rotation or axis 16 of rotatable member 12.

In FIGURES 3 and 4, rotatable member 12 is shown to be a disc of nonferrous material including a radial bore 18 which slidably accommodates permanent magnet 10. Bore 18 is closed at the outer periphery of rotatable member 12 by a screw member 20 and a spring member 22 is disposed between screw member 20 and permanent magnet 10. It is to be specifically understood that bore 18 may be closed at the outer periphery of rotatable member 12 by any suitable device and this invention is not to be construed to be limited to a screw.

A magnetically operable switching device is used in combination with a permanent magnet 10 and is located in operative relationship with permanent magnet 10 when motor 5 is rotating at the predetermined speed. This magnetically operable switching device may be a conventional glass enclosed reed type switch 25 having two magnetically closable normally open contacts 27 and 28.

To mount reed switch 25, a mounting member 29, which may be attached to motor 5 or any other suitable support by screws, one of which is shown at 19, is provided. Mounting member 29 may include a slot, one of which is shown at 21, for each of the mounting screws 19 to permit the adjustment of reed switch 25 relative to permanent magnet 10 to precisely obtain a selected speed and to select a plurality of different speeds. The predetermined speed at which motor 5 is to rotate may be selected by slidably adjusting support member 29 to locate reed switch 25 in operative relationship with permanent magnet 10 at various distances from center of rotation or axis 16 of rotatable member 12. As reed switch 25 is mounted stationary relative to motor 5, reed switch 25 may be precisely adjusted while the rotor of motor 5 is rotating.

In each of the embodiments of FIGURES 1-7, inclusive, as motor 5 increases in speed, permanent magnet 10 is displaced by a distance proportional to rotational speed and in a direction generally away from the center of rotation or axis 16 of rotational member 12. When the speed of motor 5 has reached the preselected speed, as determined by the location of reed switch 25, permanent magnet 10 is in operative relationship with the contacts 27 and 28 of reed switch 25 and operates these contacts to close, which indicates that motor 5 has reached the predetermined speed.

To maintain motor 5 at this speed, electrical circuitry responsive to the operation of reed switch 25 to interrupt the energizing circuit for motor 5 is provided. Alternate embodiments of electrical circuitry of this type is schematically set forth in FIGURES 8 and 9.

The electrical circuitry set forth in FIGURES 8 and 9 is responsive to the closure of contacts 27 and 28 to interrupt the energizing circuit for motor 5, with the circuit of FIGURE 8, or to reduce the magnitude of potential applied across motor 5, with the circuit of FIGURE 9. Both of these conditions prevent motor 5 from rotating at a greater speed and, consequently, tend to maintain the speed of motor 5 at the preselected value.

In FIGURE 8, type NPN transistor 50 and type PNP transistor 60 are normally conducting. Upon the closure of contacts 27 and 28 of reed switch 25 when motor 5 is rotating at the selected speed, capacitor 26 begins to charge through resistor 31 and the base-emitter junction of transistor 50, a condition which base drives transistor 50 to greater conduction. Upon the opening of contacts 27 and 28 as permanent magnet 10 moves out of operational relationship with reed switch 25, capacitor 26 discharges through resistor 30, battery 32 and resistor 34. As capacitor 26 discharges, the potential at junction 35 goes negative with respect to ground to remove the base drive current of transistor 50, consequently, transistor 50 goes nonconductive until capacitor 26 has discharged. With transistor 50 nonconductive, the base and emitter electrodes of transistor 60 are at substantially the same potential, consequently, base drive current is removed from transistor 60 and this device goes nonconductive to interrupt the supply circuit for motor 5, a condition which tends to slow motor 5. At the next revolution of rotatable member 12, this sequence of events is repeated and tends to maintain motor 5 at the predetermined speed.

The circuit schematically set forth in FIGURE 9, wherein like elements have been assigned like characters of reference, operates in a manner similar to that of FIGURE 8 except that the combination of capacitor 82 and resistors 84 and 86 operate transistor 70 as a variable resistor which, in turn, controls the degree of conduction through transistor 60 in a manner to vary the magnitude of supply potential across motor 5 to maintain motor 5 at the predetermined speed.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A system for maintaining an electric motor at a predetermined speed comprising in combination with an electric motor and a source of supply potential, a rotatable member which is revolvable at a speed which is a function of the speed of said motor, a permanent magnet, mounting means which permits displacement of said permanent magnet by a distance proportional to rotational speed for mounting said permanent magnet upon said rotatable member, a magnetically operable switching device, mounting means for locating said magnetically operable switching device in operational relationship with said permanent magnet when said motor is rotating at said predetermined speed and circuit means responsive to the operation of said magnetically operable switching device for controlling the potential supplied to said motor.

2. A system for maintaining an electric motor at a predetermined speed as defined in claim 1 wherein said rotatable member is secured to a rotating element of said motor.

3. A system for maintaining an electric motor at a predetermined speed as defined in claim 1 wherein said rotatable member is driven by said motor.

4. A system for maintaining an electric motor at a predetermined speed as defined in claim 1 wherein said rotatable member is a rotatable disc member of nonferrous material and said mounting means which permits displacement of said permanent magnet by a distance proportional to rotational speed comprises a radial bore in said rotatable disc member which slidably accommodates said permanent magnet, closing means for closing said bore at the outer periphery of said rotatable disc member and a spring disposed between said closing means and said permanent magnet.

5. A system for maintaining an electric motor at a predetermined speed as defined in claim 1 wherein said mounting means which permits displacement of said permanent magnet by a distance proportional to rotational speed is a spring.

6. A system for maintaining an electric motor at a predetermined speed as defined in claim 1 wherein said mounting means for locating said magnetically operable switching device in operational relationship with said permanent magnet when said motor is rotating at said predetermined speed is adjustable to permit the selection of a plurality of speeds.

7. A governor for maintaining an electric motor at a predetermined speed as defined in claim 1 wherein said magnetically operable switching device is a reed switch.

References Cited

UNITED STATES PATENTS

| | | | |
|---|---|---|---|
| 2,861,204 | 11/1958 | Bauer | 318—346 X |
| 3,194,914 | 7/1965 | Brown | 200—80 |
| 3,317,804 | 5/1967 | Dorfner et al. | 318—325 |

BENJAMIN DOBECK, *Primary Examiner.*

J. J. BAKER, *Assistant Examiner.*